Dec. 29, 1970    W. HEROLD    3,550,234
METHOD OF ASSEMBLING A WHEEL HAVING VANES
Filed April 2, 1968

INVENTOR
WERNER HEROLD
BY
AGENTS

United States Patent Office 3,550,234
Patented Dec. 29, 1970

3,550,234
METHOD OF ASSEMBLING A WHEEL
HAVING VANES
Werner Herold, Schweinfurt, Germany, assignor to Fichtel & Sachs Aktiengesellschaft, Schweinfurt, Germany
Filed Apr. 2, 1968, Ser. No. 718,122
Claims priority, application Germany, Apr. 7, 1967,
F 52,099
Int. Cl. B21k 3/04
U.S. Cl. 29—156.8               8 Claims

ABSTRACT OF THE DISCLOSURE

The outer and inner shells of the impeller in a hydraulic transmission element are pre-assembled with the interposed vanes by copper-plating the vanes, engaging a first group of lugs on the vanes with recesses on the outer shell, passing a second group of lugs on the vanes through slots in the inner shell, bending the projecting lug portions toward the inner surface of the inner shell, and then placing the pre-assembled impeller in a furnace hot enough to melt the copper which is drawn by capillarity into the narrow spaces between lugs and shells.

BACKGROUND OF THE INVENTION

This invention relates to the assembling of hydraulic transmissions, and particularly to a method of assembling wheels of such a transmission which have vanes.

The invention will be described hereinafter with specific reference to the impeller of a hydraulic torque converter for an automobile, but it should be understood that it is equally applicable to similar wheels in other hydraulic transmission elements.

It is common practice to connect sheet metal elements, such as the shells and vanes of a torque converter impeller by means of solder preforms which are placed between the sheet metal parts and connect the same when the pre-assembled parts are first heated beyond the melting point of the solder, and thereafter cooled.

It is difficult to place the solder preforms precisely in position and an excess of solder must be used to ensure a firm bond even if the preform is slightly misplaced. The excess metal tends to wet and to mar surfaces for which it is not intended. The efficiency of a hydraulic transmission is impaired by surface defects on the several wheels, such as the impeller, and spattered solder must be removed manually in a cleaning operation which is costly in time and labor.

Similar difficulties arise when the impeller elements are to be brazed to each other by means of copper powder which is applied to the prospective brazed joints in a liquid carrier.

The primary object of the invention is the provision of a method which permits the shells and vanes of an impeller or similar wheel for an automatic transmission to be assembled quickly, conveniently, at low cost, and yet securely.

SUMMARY OF THE INVENTION

In one of its aspects, the invention resides in an improvement in the conventional brazing step normally resorted to after the shells and vanes have been pre-assembled by interengagement of respective projections and recesses which receive the projections.

According to the invention, substantially the entire surface of each vane is coated prior to the pre-assembling step with a thin layer of a fusible metal, such as electrodeposited copper, which has a much higher melting point than the usual tin-based and lead-based soldering alloys, but melts at a much lower temperature than the steel of the shells and vanes. The pre-assembled vanes and shells are then placed in a furnace hot enough to fuse the thin copper layers, the furnace and its operation being substantially conventional, and are firmly assembled when cooled thereafter.

Other features, additional objects and many of the attendant advantages of this invention will readily be appreciated from the following detailed description of a preferred embodiment when considered in connection with the appended drawing.

DESCRIPTION OF THE PREFERRED EMBODIMENT

Figure 1:
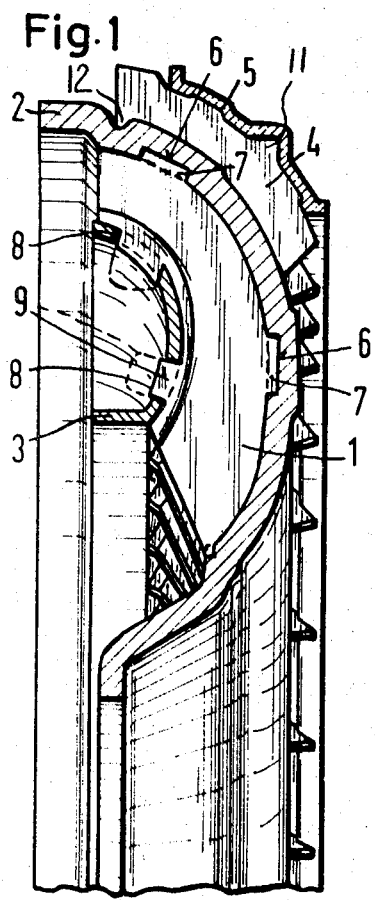
FIG. 1 shows the impeller of a hydraulic torque converter in fragmentary side-elevational section on the line I—I in FIG. 2.
Figure 2:
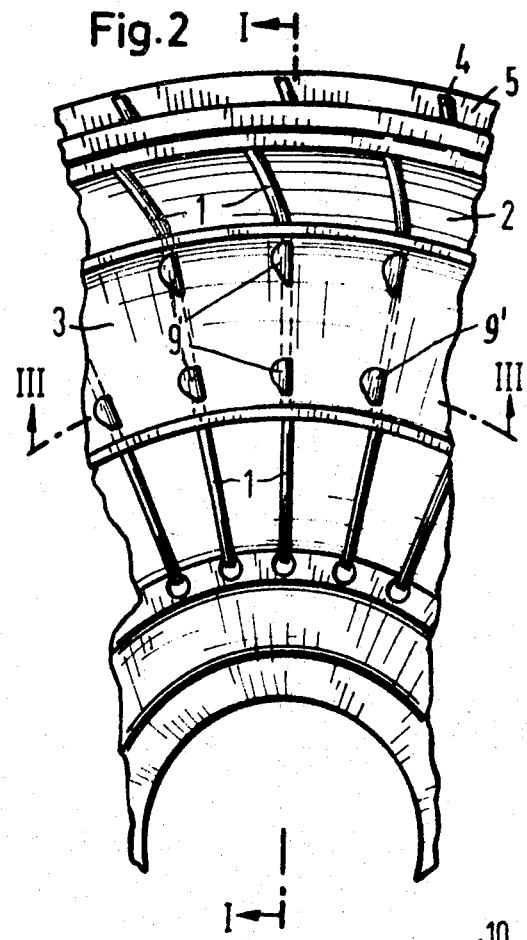
FIG. 2 illustrates the apparatus of FIG. 1 in fragmentary front elevation.

The illustrated impeller has a multiplicity of spacedly arranged sheet steel vanes 1 which connect an outer steel shell 2 with an inner steel shell 3. Similarly arranged external fins 4 on the outer shell 2 connect the same to an annular shroud 5.

A first group of recesses 6 is arranged on the inner surface of the shell 2 and receives a corresponding group of projecting lugs 7 on the vanes 1, each vane having two lugs 7 of this first group. A second group of recesses 8 extend through the inner shell 3 in two circular rows. A corresponding second group of lugs 9 on the vanes 1 pass through the recesses 8, and the portions 9' thereof which project inward from the inner shell are flattened against the shell 3 so as to define therewith a gap of capillary dimensions.

Figures 4, 5:
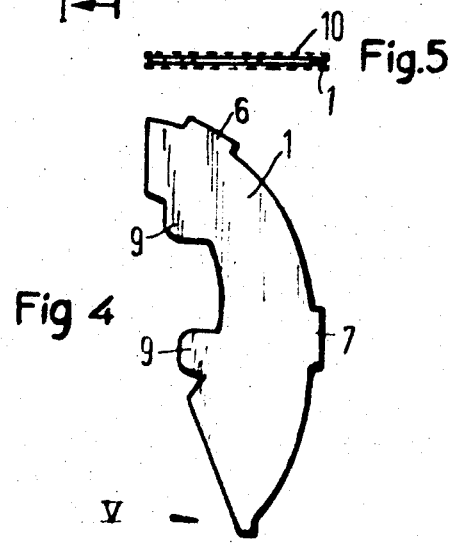
FIG. 4 shows one of the sheet metal impeller vanes in a view toward one of its major faces.
FIG. 5 shows the vane of FIG. 4 in a lateral view taken in the direction of the arrow V in FIG. 4.

Prior to being assembled with the carefully cleaned shells 2, 3 and the shroud 5, the vanes 1 and fins 3 are electroplated with copper to a thickness of .015 to .02 mm. The copper plate 10 is shown on a vane 1 in FIG. 5 where its thickness has been exaggerated for the convenience of pictorial representation.

Figure 3:
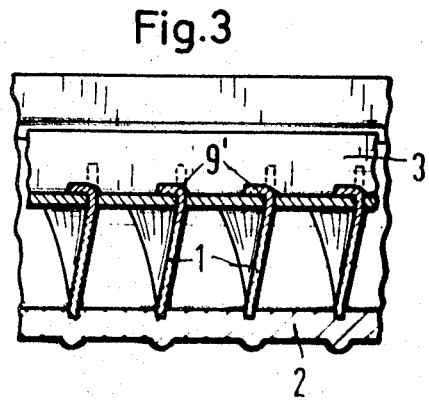
FIG. 3 shows a portion of the device of FIG. 2 in developed section on the line III—III.

The copper plated vanes and fins are pre-assembled with the shells 2, 3 and the shroud 5 by interengaging the projections 6, 9 of the vanes 1 and corresponding projections 11, 12 of the fins 5 with recesses 6, 8 in the shells 2, 3 and with conforming recesses in the shroud 5. The portions 9' of the lugs 9 which project inward from the inner shell 3 initially have the shape shown in broken lines in FIGS. 1 and 3, and are then bent down flat on the inner face of the shell 3, as is shown in fully drawn lines.

The pre-assembly is placed in a brazing furnace in a position in which the axis of the impeller is vertical and the shroud 5 rests on the furnace floor. The melting copper is drawn by capillary effects into the interstices between the projections 7, 9, 11, 12 and the walls of the corresponding recesses, the projections and recesses being dimensioned for a clearance of .05 to .2 mm.

The capillary attraction of the walls in the interstices for the liquid copper is sufficient to draw a portion of the copper even upward against the force of gravity. When the copper is solidified by cooling of the assembly, a securely brazed impeller is obtained. The amount of copper ultimately remaining on the exposed faces of the vanes 1 and fins 4 is minimal, and no exposed copper at all can be found when the dimensions of the interstices and the thickness of the copper plate are precisely coordinated by a test run with several blades electroplated to different thicknesses of copper.

Copper is the preferred brazing material because of the ease with which a uniform thin layer of the metal can be deposited over the entire surface of each vane 1 or fin 4, and because of its low cost. Other metals and alloys commonly employed for brazing may be resorted to in an obvious manner, particularly when the shells and vanes consist of metals other than steel.

In the specific embodiment of the invention illustrated in the drawing and described above, the vanes 1 are 1 mm. thick, whereas the thickness of the fins 4 is 2 mm. The vanes 1 and fins 4 are uniformly coated with electrodeposited copper to a thickness of 0.025 mm. prior to assembly of the vanes 1 with the shells 2, 3.

The initial clearances between the vanes 1 and the shells 2, 3 in the recesses 6 and openings 8 are 0.05 to 0.1 mm., and the gaps between the bent-over lug portions 9' and the inner face of the inner shell 3 are 0.05 mm. wide prior to heat treatment.

The partly copper plated assembly is heated in a protective atmosphere to about 1100° C., that is, slightly beyond the melting point of copper. Nitrogen is the preferred gas in the protective atmosphere, but other gases free from elementary oxygen or oxygen capable from reacting with copper may be used in an obvious manner. Neither the rate at which the vanes are heated to and beyond the melting point of copper, nor the rate at which they are subsequently cooled to room temperature is critical.

I claim:
1. In a method of assembling a wheel for a hydraulic transmission, the wheel having an outer metal shell, an inner metal shell spaced from said outer shell, and a plurality of spaced metal vanes connecting the shells in which the vanes are pre-assembled with the shells by interengagement of respective projections and recesses receiving said projections, and the pre-assembled shells and vanes are brazed to each other, the improvement in the brazing which comprises:
 (a) coating substantially the entire surface of each of said vanes prior to said pre-assembling by electro-depositing on said surface a thin layer of a fusible metal having a melting point higher than the melting points of tin-based and lead-based soldering alloys, but lower than the respective melting points of said shells and vanes,
  (1) the assembled, coated vanes defining with said shells interstices of capillary dimensions; and
 (b) heating said pre-assembled vanes and shells to a temperature sufficient to fuse said thin layer until a portion of said fusible metal on said vanes outside said interstices is drawn into said interstices by capillary attraction,

2. In a method as set forth in claim 1, wherein said wheel additionally has a plurality of external fins on said outer shell and a shroud remote from said outer shell and connecting said fins, and wherein said fins are pre-assembled with said outer shell and said shroud by interengagement of respective projections and recesses, and the pre-assembled outer shell, fins and shroud are brazed to each other, the additional improvement which comprises coating substantially the entire surface of each of said fins prior to said pre-assembling thereof with a thin layer of said fusible metal.

3. In a method as set forth in claim 1, said projections and recesses being dimensioned prior to said electroplating to define clearances of 0.05 to 0.2 mm. between each projection and the walls of the recess in which the projection is received, and the thickness of said thin layer being substantially smaller than the dimension of said clearances.

4. In a method as set forth in claim 3, said outer shell being formed with a first group of said recesses, and said vanes carrying a first group of said projections respectively received in the recesses of said first group of recesses.

5. In a method as set forth in claim 4, said vanes carrying a second group of said projections, said inner shell being formed with a second group of recesses extending through said recesses, said inner shell being pre-assembled with said vanes by passing the projections of said second group of projections through the recesses of said second group of recesses until the projection of said second group extend from said inner shell in a direction away from said outer shell, and thereafter bending a portion of each projection until it forms a gap of capillary dimensions with a face of said inner shell.

6. In a method as set forth in claim 1, said fusible metal being copper.

7. In a method as set forth in claim 6, at least one of said shells having an exposed surface of ferrous metal defining said interstices with said coated vanes at the time of said heating.

8. In a method as set forth in claim 3, said preassembled vanes and shells being heated until the amount of said fusible metal in said interstices is greater than the amount of said fusible metal on said vanes outside said interstices.

References Cited
UNITED STATES PATENTS

| | | | |
|---|---|---|---|
| 2,807,074 | 9/1957 | Schroeder | 29—502X |
| 2,880,962 | 4/1959 | Stalker | 29—156.8X |
| 2,985,898 | 5/1961 | Goude | 29—502X |

JOHN F. CAMPBELL, Primary Examiner

D. C. REILEY, Assistant Examiner

U.S. Cl. X.R.

29—502